United States Patent
Wu

(10) Patent No.: US 11,645,463 B2
(45) Date of Patent: May 9, 2023

(54) NATURAL LANGUAGE PROCESSING SYSTEM, NATURAL LANGUAGE PROCESSING METHOD AND NON-TRANSITORY COMPUTER READABLE MEDIUM

(71) Applicant: NANYA TECHNOLOGY CORPORATION, New Taipei (TW)

(72) Inventor: Chun-Wei Wu, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 305 days.

(21) Appl. No.: 16/894,873

(22) Filed: Jun. 7, 2020

(65) Prior Publication Data

US 2021/0383061 A1    Dec. 9, 2021

(51) Int. Cl.
| | | |
|---|---|---|
| G06F 40/20 | (2020.01) | |
| G06F 17/16 | (2006.01) | |
| G06F 40/284 | (2020.01) | |
| G06F 17/18 | (2006.01) | |
| G06F 18/24 | (2023.01) | |

(52) U.S. Cl.
CPC .......... *G06F 40/284* (2020.01); *G06F 17/16* (2013.01); *G06F 17/18* (2013.01); *G06F 18/24* (2023.01); *G06F 40/20* (2020.01)

(58) Field of Classification Search
None
See application file for complete search history.

(56) References Cited

U.S. PATENT DOCUMENTS

| | | | |
|---|---|---|---|
| 2005/0157848 A1* | 7/2005 | Miyauchi | A61B 6/566 378/207 |
| 2018/0277235 A1* | 9/2018 | Pingle | G11C 29/36 |

FOREIGN PATENT DOCUMENTS

| | | |
|---|---|---|
| CN | 1277192 C | 9/2006 |
| CN | 110825768 A | 2/2020 |
| TW | 201117115 A | 5/2011 |

OTHER PUBLICATIONS

Zhao Yang et al., "Text Mining Based Fault Diagnosis of Vehicle On-board Equipment for High Speed Railway," 2014 IEEE 17th International Conference on Intelligent Transportation Systems (ITSC) Oct. 8-11, 2014. Qingdao, China, pp. 900-905.

I-Chin Wu et al., "A Vehicular Maintenance and Replacement Decision Support System in Distribution Services: A Data Mining Technique", Journal of Management & Systems, vol. 21, No. 1, Jan. 2014, pp. 111-137.

Yi Lu Murphey et al., "Vehicle Fault Diagnostics Using Text Mining, Vehicle Engineering Structure and Machine Learning," International Journal of Intelligent Information Systems, vol. 4, No. 3, 2015, pp. 58-70.

* cited by examiner

*Primary Examiner* — Quynh H Nguyen

(74) *Attorney, Agent, or Firm* — CKC & Partners Co., LLC

(57) ABSTRACT

A natural language processing system includes a storage device and a processor. The storage device is configured to preload records of failure histories of semiconductor equipment, and the records of the failure histories of the semiconductor equipment include natural language. The processor is electrically connected to the storage device and is configured to perform a natural language process on the records of the failure histories of the semiconductor equipment to generate an abnormal model classification table.

12 Claims, 2 Drawing Sheets

NATURAL LANGUAGE PROCESSING SYSTEM, NATURAL LANGUAGE PROCESSING METHOD AND NON-TRANSITORY COMPUTER READABLE MEDIUM

BACKGROUND

Field of Invention

The present invention relates to natural language processing systems and methods.

DESCRIPTION OF RELATED ART

A semiconductor material has an electrical conductivity value falling between that of a conductor and an insulator. Normally, semiconductor equipment can be used to manufacture semiconductor devices.

However, the semiconductor equipment often fails due to various problems, and engineers usually waste a lot of time to fix the semiconductor equipment by their undependable experiences.

SUMMARY

An embodiment of the present disclosure is related to a natural language processing system includes a storage device and a processor. The storage device is configured to preload records of failure histories of semiconductor equipment, and the records of the failure histories of the semiconductor equipment include natural language. The processor is electrically connected to the storage device and is configured to perform a natural language process on the records of the failure histories of the semiconductor equipment to generate an abnormal model classification table.

Another embodiment of the present disclosure is related to. The natural language processing method includes steps of: preloading records of failure histories of semiconductor equipment, where the records of the failure histories of the semiconductor equipment comprise natural language; performing a natural language process on the records of the failure histories of the semiconductor equipment to generate an abnormal model classification table.

Yet another embodiment of the present disclosure is related to a non-transitory computer readable medium to store a plurality of instructions for commanding a server to execute a natural language processing method. The natural language processing method includes steps of: preloading records of failure histories of semiconductor equipment, where the records of the failure histories of the semiconductor equipment comprise natural language; performing a natural language process on the records of the failure histories of the semiconductor equipment to generate an abnormal model classification table.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
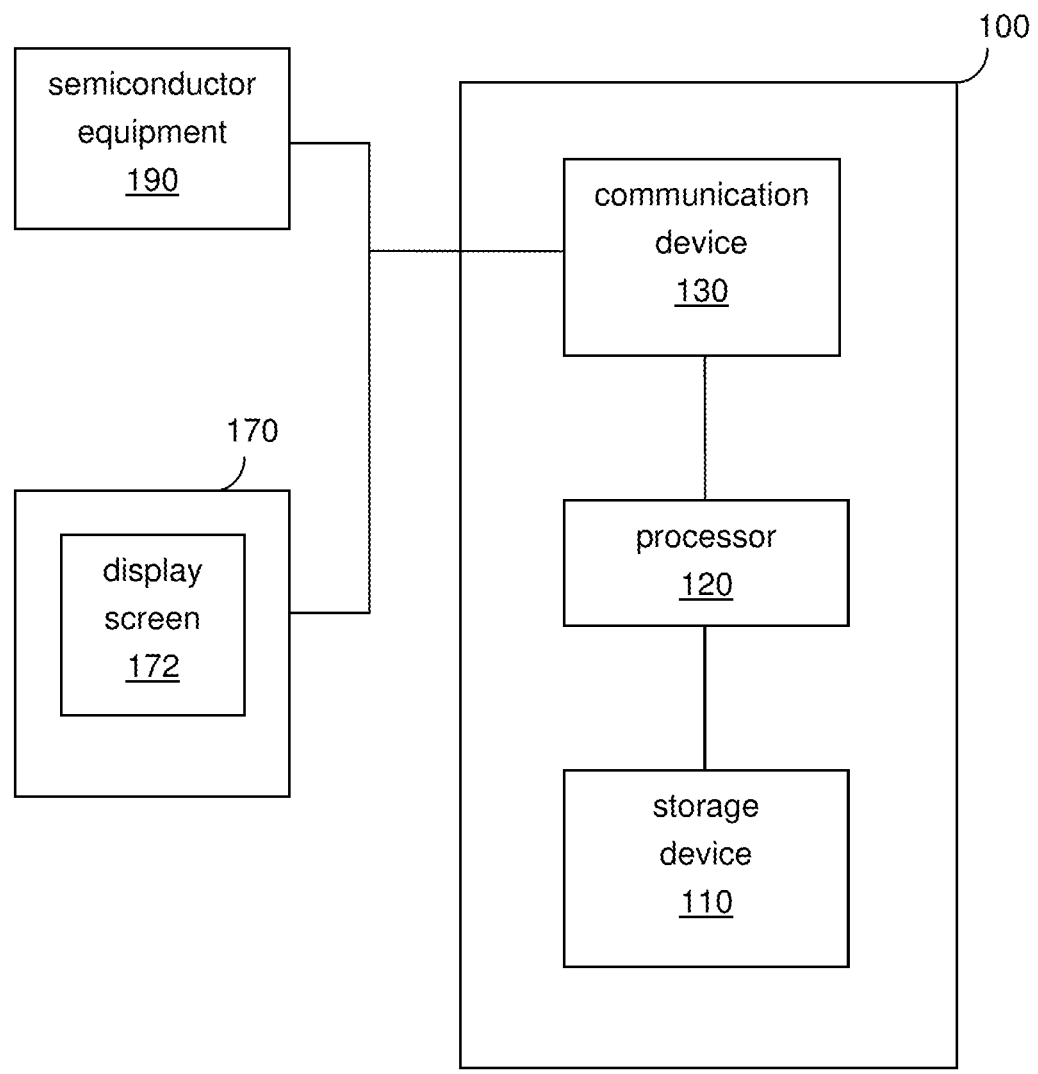
FIG. 1 is a block diagram of a natural language processing system according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a natural language processing system 100 according to some embodiments of the present disclosure. As shown in FIG. 1, the natural language processing system 100 includes a storage device 110, a processor 120 and a communication device 130. For example, the natural language processing system 100 may be a server or the like, in which the storage device 110 may be storage hardware, such as a hard disk drive (HDD) or a solid-state drive (SSD), the processor 120 may be a central processing unit (CPU), and the communication device 130 may be wired or wireless communication circuit.

In structure, the communication device 130 is electrically connected to the processor 120, and the processor 120 is electrically connected to the storage device 110. The communication device 130 can communicate with a computer 170 and/or semiconductor equipment 190. The computer 170 has a display screen 172. For example, the display screen 172 may be a LCD or the like.

In practice, the semiconductor equipment 190 can be used to manufacture semiconductor devices. Every time the semiconductor equipment 190 fails, an engineer fixes the semiconductor equipment 190; accordingly, the engineer uses natural language to record a record of failure history of the semiconductor equipment 190 through the computer 170, the semiconductor equipment 190 or another device. Therefore, the records of the failure histories of the semiconductor equipment include natural language.

For example, the record of the failure history of the semiconductor equipment 190 is described in below.

| EQP_LIST | ISSUE | EVENT | TEXTCONTENT |
|---|---|---|---|
| FCV103N | UV Lamp fault | CHA-side1 lamp B UV lamp fault | 1. When tool run P94911700E #23~24 occur tool alarm<br>2. Check alarm message: side1 lamp B UV lamp fault: phase control at limit<br>3. Reset and standby lamp ok<br>4. Re-curing #25~01 OK<br>5. Pass TA dummy OK and tool keep run<br>Down time: 12/5 10::00~11:10 |

In use, the communication device 130 receives the records of the failure histories of the semiconductor equipment 190 from the computer 170, the semiconductor equipment 190 or another device. The storage device 110 preloads the records of failure histories of semiconductor equipment 190. The processor 120 performs a natural language process on the records of the failure histories of the semiconductor equipment 190 to generate an abnormal model classification table. Then, the communication device 130 transmits the abnormal model classification table to the computer 170, so that the display screen 172 of the computer 170 can display the abnormal model classification table, where the abnormal model classification table classifies topics of various problems of the semiconductor equipment 190 and provides corresponding solutions. Thus, the abnormal model classification table can help the engineer to quickly find the way to fix the semiconductor equipment 190 whenever the semiconductor equipment 190 fails again.

In some embodiments, the storage device 110 stores a dictionary file, and the processor 120 is according to the dictionary file to find valid words in the records of the failure histories of the semiconductor equipment 190, so as to generate a record-word matrix that indicates word frequencies of valid words in each of the records of the failure histories of the semiconductor equipment. For example, the dictionary file defines invalid words, and therefore the remaining words in the records are the valid words.

In some embodiments, the storage device 110 stores a latent Dirichlet allocation (LDA) model, and the processor 120 is based on the LDA model to analyze the record-word matrix so as to generate a topic-word matrix and a record-topic matrix.

In some embodiments, the topic-word matrix indicates a respective ratio of each of the valid words to all of the valid words in each of different topics. For example, a portion of the topic-word matrix is described in below, in which $t\_1$, $t\_2$ and $t\_3$ represent different topics, and asi_pca, psg_psg, and pressure_chart are different valid words.

|  | asi_pca | psg_psg | pressure_chart | ... |
|---|---|---|---|---|
| $t\_1$ | 0.01848976 | 0.01848967 | 0.03143472 | ... |
| $t\_2$ | 0.02101414 | 0.02101414 | 0.03572662 | ... |
| $t\_3$ | 0.01974031 | 0.01974032 | 0.03356095 | ... |
| . | . | . | . | . |
| . | . | . | . | . |

In some embodiments, the record-topic matrix indicates a respective relevance between each of the different topics and each of the records of the failure histories of the semiconductor equipment 190. For example, a portion of the record-topic matrix is described in below, in which $t\_1$, $t\_2$ and $t\_3$ represent different topics, and numbers 3, 6, and 33 represent corresponding records respectively.

|  | $t\_1$ | $t\_2$ | $t\_3$ | ... |
|---|---|---|---|---|
| 3 | 0.244000000 | 0.004000000 | 0.004000000 | ... |
| 6 | 0.011111111 | 0.455555556 | 0.011111111 | ... |
| 33 | 0.011111111 | 0.011111111 | 0.011111111 | ... |
| . | . | . | . | . |
| . | . | . | . | . |

In some embodiments, the processor 120 is based on the topic-word matrix and the record-topic matrix to generate the abnormal model classification table that indicates a respective prevalence of each of the different topics and at least one relevant term of each of the different topics, where the relevant term is selected from the valid words; for instance, the most number of words in the valid words are selected as the relevant terms. For example, a portion of the abnormal model classification table is described in below, in which top terms represent the at least one relevant term of each topic.

| topic | label | coherence | prevalence | top terms | | |
|---|---|---|---|---|---|---|
| $t\_4$ | side_rf | 0.215 | 14.478 | rf | side | impedance | ... |
| $t\_6$ | chart_step | 0.101 | 13.769 | chart | flow | teos | ... |
| $t\_3$ | pca_chart | 0.134 | 12.886 | chart | pca | pca_chart | ... |
| $t\_7$ | pca_chart | 0.079 | 12.802 | chart | hx | suspect | ... |
| $t\_5$ | heater_temp | 0.348 | 10.990 | temp | heater | heater_temp | ... |
| . | . | . | . | . | . | . |
| . | . | . | . | . | . | . |

Figure 2:
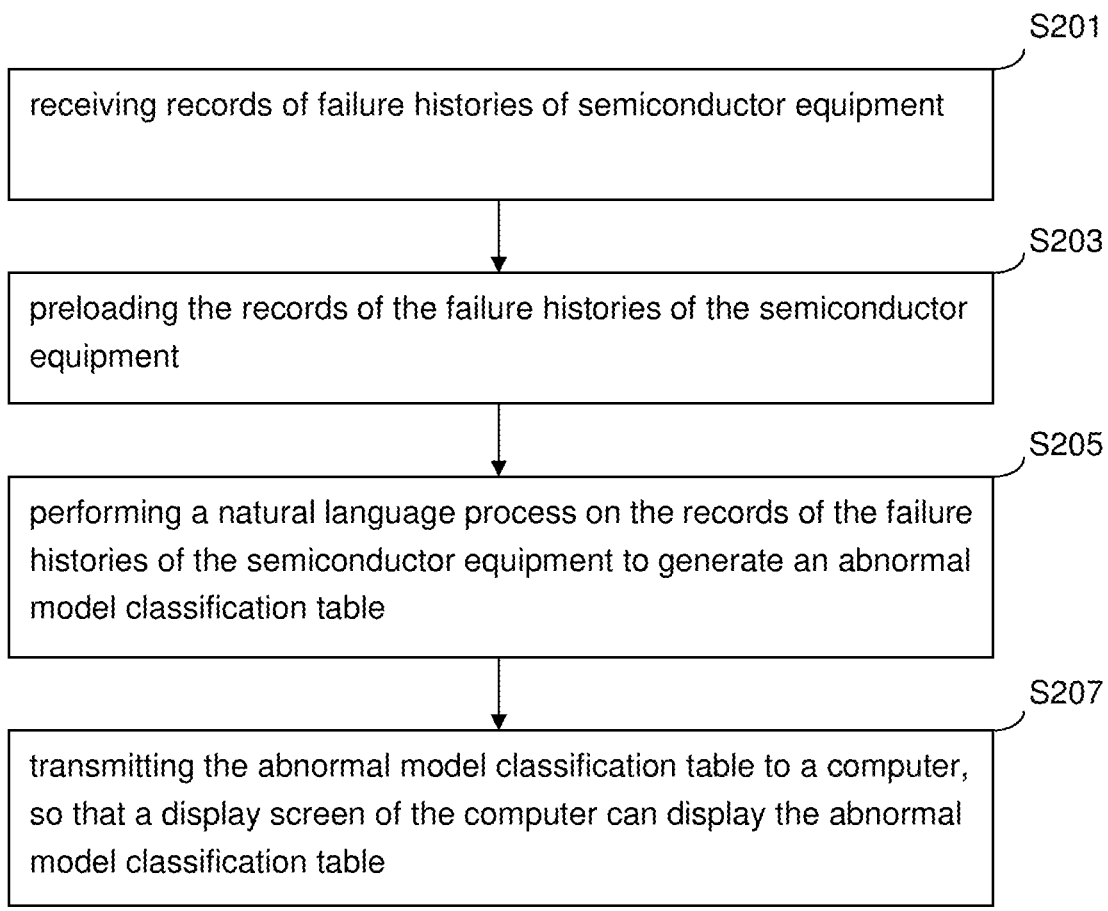
FIG. 2 is a flow chart of a natural language processing method according to some embodiments of the present disclosure.

For a more complete understanding of a natural language processing method performed by the natural language processing system 100, referring FIGS. 1-2, FIG. 2 is a flow chart of the natural language processing method 200 according to an embodiment of the present disclosure. As shown in FIG. 2, the natural language processing method 200 includes operations S201, S203, S205 and S207. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

The natural language processing method 200 may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

In practice, every time the semiconductor equipment 190 fails, the engineer fixes the semiconductor equipment 190; accordingly, the engineer uses natural language to record a record of failure history of the semiconductor equipment 190 through the computer 170, the semiconductor equipment 190 or another device. In operation S201, the records of the failure histories of the semiconductor equipment 190 are received from the computer 170, the semiconductor equipment 190 or another device, where the records of the failure histories of the semiconductor equipment include natural language.

Then, in operation S203, the records of failure histories of semiconductor equipment 190 are preloaded. In operation S205, a natural language process is performed on the records of the failure histories of the semiconductor equipment 190 to generate an abnormal model classification table. In operation S207, the abnormal model classification table is transmitted to the computer 170, so that the display screen 172 of the computer 170 displays the abnormal model classification table, where the abnormal model classification table classifies topics of various problems of the semiconductor equipment 190 and provides corresponding solutions. Thus, the abnormal model classification table can help the engineer to quickly find the way to fix the semiconductor equipment 190 whenever the semiconductor equipment 190 fails again.

In some embodiments, in operation S205, valid words are found in the records of the failure histories of the semiconductor equipment 190 according to a dictionary file, so as to generate a record-word matrix that indicates word frequencies of valid words in each of the records of the failure histories of the semiconductor equipment 190.

In some embodiments, in operation S205, the record-word matrix is analyzed based on a LDA model, so as to generate a topic-word matrix and a record-topic matrix.

In some embodiments, the topic-word matrix indicates a respective ratio of each of the valid words to all of the valid words in each of different topics, and the record-topic matrix indicates a respective relevance between each of the different topics and each of the records of the failure histories of the semiconductor equipment 190.

In some embodiments, the abnormal model classification table based on the topic-word matrix and the record-topic matrix is generated, where the abnormal model classification table indicates a respective prevalence of each of the different topics and at least one relevant term of each of the different topics, and the at least one relevant term is selected from the valid words.

In view of the above, the natural language processing system 100 and the natural language processing method 200 can classifies topics of various problems of the semiconductor equipment 190 and provides corresponding solutions, thereby helping the engineer to quickly find the way to fix the semiconductor equipment 190 whenever the semiconductor equipment 190 fails again.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A natural language processing system, comprising:
  a storage device configured to store records of failure histories of semiconductor equipment, wherein the records of the failure histories of the semiconductor equipment comprise natural language; and
  a processor electrically connected to the storage device and configured to perform a natural language process on the records of the failure histories of the semiconductor equipment to generate an abnormal model classification table,
  wherein the storage device stores a dictionary file, and the processor is configured to use the dictionary file to find valid words in the records of the failure histories of the semiconductor equipment, so as to generate a record-word matrix that indicates word frequencies of valid words in each of the records of the failure histories of the semiconductor equipment,
  wherein the storage device stores a latent Dirichlet allocation (LDA) model, and the processor is configured to perform the LDA model to analyze the record-word matrix so as to generate a topic-word matrix and a record-topic matrix,
  wherein the processor is configured to use the topic-word matrix and the record-topic matrix to generate the abnormal model classification table, and configured to transmit the abnormal model classification table to a display screen of a computer for display thereon, wherein the abnormal model classification table is for classifying different topics of problems of the semiconductor equipment and providing solutions corresponding to the problems.

2. The natural language processing system of claim 1, wherein the topic-word matrix indicates a respective ratio of each of the valid words to all of the valid words in each of the different topics, and the record-topic matrix indicates a respective relevance between each of the different topics and each of the records of the failure histories of the semiconductor equipment.

3. The natural language processing system of claim 2, wherein the abnormal model classification table indicates a respective prevalence of each of the different topics and at least one relevant term of each of the different topics, wherein the at least one relevant term is selected from the valid words.

4. The natural language processing system of claim 1, further comprising:
  a communication device electrically connected to the processor and configured to transmit the abnormal model classification table to the computer, so that the display screen of the computer displays the abnormal model classification table.

5. The natural language processing system of claim 4, wherein the communication device receives the records of the failure histories of the semiconductor equipment.

6. A natural language processing method, comprising steps of:
  preloading, by a storage device, records of failure histories of semiconductor equipment, wherein the records of the failure histories of the semiconductor equipment comprise natural language; and
  performing a natural language process, by a processor, on the records of the failure histories of the semiconductor equipment to generate an abnormal model classification table, wherein the step of performing the natural language process, by the processor, on the records of the failure histories of the semiconductor equipment comprises:

finding, by the processor, valid words in the records of the failure histories of the semiconductor equipment by using a dictionary file stored in the storage device, so as to generate a record-word matrix that indicates word frequencies of valid words in each of the records of the failure histories of the semiconductor equipment;

analyzing, by the processor, the record-word matrix by performing a latent Dirichlet allocation (LDA) model stored in the storage device, so as to generate a topic-word matrix and a record-topic matrix;

generating, by the processor, the abnormal model classification table, by using the topic-word matrix and the record-topic matrix; and transmitting, by the processor, the abnormal model classification table to a display screen of a computer for display thereon, wherein the abnormal model classification table is for classifying different topics of problems of the semiconductor equipment and providing solutions corresponding to the problems.

7. The natural language processing method of claim 6, wherein the topic-word matrix indicates a respective ratio of each of the valid words to all of the valid words in each of the different topics, and the record-topic matrix indicates a respective relevance between each of the different topics and each of the records of the failure histories of the semiconductor equipment.

8. The natural language processing method of claim 7, generating the abnormal model classification table based on the topic-word matrix and the record-topic matrix, wherein the abnormal model classification table indicates a respective prevalence of each of the different topics and at least one relevant term of each of the different topics, and the at least one relevant term is selected from the valid words.

9. The natural language processing method of claim 6, further comprising:

receiving the records of the failure histories of the semiconductor equipment.

10. A non-transitory computer readable medium to store a plurality of instructions for commanding a server to execute a natural language processing method, and the natural language processing method comprising steps of:

preloading, by a storage device, records of failure histories of semiconductor equipment, wherein the records of the failure histories of the semiconductor equipment comprise natural language; and performing a natural language process, by a processor, on the records of the failure histories of the semiconductor equipment to generate an abnormal model classification table, wherein the step of performing the natural language process, by the processor, on the records of the failure histories of the semiconductor equipment comprises:

finding, by the processor, valid words in the records of the failure histories of the semiconductor equipment by using a dictionary file stored in the storage device, so as to generate a record-word matrix that indicates word frequencies of valid words in each of the records of the failure histories of the semiconductor equipment;

analyzing, by the processor, the record-word matrix by performing a latent Dirichlet allocation (LDA) model stored in the storage device, so as to generate a topic-word matrix and a record-topic matrix;

generating, by the processor, the abnormal model classification table, by using the topic-word matrix and the record-topic matrix; and transmitting, by the processor, the abnormal model classification table to a display screen of a computer for display thereon, wherein the abnormal model classification table is for classifying different topics of problems of the semiconductor equipment and providing solutions corresponding to the problems.

11. The non-transitory computer readable medium of claim 10, wherein the topic-word matrix indicates a respective ratio of each of the valid words to all of the valid words in each of the different topics, and the record-topic matrix indicates a respective relevance between each of the different topics and each of the records of the failure histories of the semiconductor equipment.

12. The non-transitory computer readable medium of claim 11, generating the abnormal model classification table based on the topic-word matrix and the record-topic matrix, wherein the abnormal model classification table indicates a respective prevalence of each of the different topics and at least one relevant term of each of the different topics, and the at least one relevant term is selected from the valid words.

\* \* \* \* \*